United States Patent
Barua et al.

(10) Patent No.: US 9,448,788 B1
(45) Date of Patent: Sep. 20, 2016

(54) BINARY REWRITING SYSTEM

(71) Applicant: SecondWrite LLC, Bethesda, MD (US)

(72) Inventors: Rajeev Barua, Bethesda, MD (US); Kapil Anand, College Park, MD (US); Aparna Kotha, College Park, MD (US); Khaled Elwazeer, Silver Spring, MD (US)

(73) Assignee: SECONDWRITE LLC, Bethesda, MD (US)

( * ) Notice: Subject to any disclaimer, the term of this patent is extended or adjusted under 35 U.S.C. 154(b) by 0 days.

(21) Appl. No.: 14/603,313

(22) Filed: Jan. 22, 2015

Related U.S. Application Data

(60) Provisional application No. 61/930,133, filed on Jan. 22, 2014.

(51) Int. Cl.
*G06F 9/44* (2006.01)

(52) U.S. Cl.
CPC .................................... *G06F 8/70* (2013.01)

(58) Field of Classification Search
CPC ....................................................... G06F 8/70
USPC ....................................................... 717/158
See application file for complete search history.

(56) References Cited

U.S. PATENT DOCUMENTS

| | | | | |
|---|---|---|---|---|
| 6,295,644 B1 * | 9/2001 | Hsu et al. | | 717/158 |
| 6,381,735 B1 * | 4/2002 | Hunt | | 717/158 |
| 6,865,735 B1 * | 3/2005 | Sirer et al. | | 717/158 |
| 8,417,998 B2 * | 4/2013 | Thomas et al. | | 714/38.1 |
| 8,423,965 B2 * | 4/2013 | Goel et al. | | 717/126 |
| 8,510,723 B2 * | 8/2013 | Barua et al. | | 717/136 |
| 8,522,225 B2 * | 8/2013 | Chen et al. | | 717/157 |
| 8,719,936 B2 * | 5/2014 | Moffie et al. | | 726/23 |
| 8,782,381 B2 * | 7/2014 | Chen et al. | | 712/233 |
| 8,799,884 B2 * | 8/2014 | Dreyer et al. | | 717/158 |
| 9,202,044 B2 * | 12/2015 | Hamlen | | |
| 2002/0066021 A1 * | 5/2002 | Chien et al. | | 713/200 |
| 2007/0300238 A1 * | 12/2007 | Kontothanassis et al. | | 719/320 |
| 2010/0299657 A1 * | 11/2010 | Barua et al. | | 717/136 |
| 2010/0306746 A1 * | 12/2010 | Barua et al. | | 717/136 |
| 2011/0066829 A1 * | 3/2011 | Tye | | G06F 8/4441 712/226 |
| 2013/0318401 A1 * | 11/2013 | Vera et al. | | 714/32 |
| 2015/0135313 A1 * | 5/2015 | Wesie et al. | | 726/22 |

OTHER PUBLICATIONS

Roy et al., Hybrid Binary Rewriting for Memory Access Instrumentation, ACM SIGPLAN Notices 46.7 (2011): 227-238 (Published Mar. 2011).*

(Continued)

*Primary Examiner* — Lewis A Bullock, Jr.
*Assistant Examiner* — Theodore Hebert
(74) *Attorney, Agent, or Firm* — Baker & Hostetler LLP

(57) ABSTRACT

A hybrid static/dynamic binary rewrite method is presented, comprising: a one-time configuration step for instrumentation of an unmodified executable binary, invoking the executable binary by copying the unmodified executable binary into a system memory image and running the binary from the system memory image, and rewriting the system memory image by inserting at a safe location one or more new instructions in place of existing instructions, where the one or more new instructions transfer execution control to instrumentation instructions located elsewhere within the system memory image, and where the instrumentation instructions that were at least in part not contained in the unmodified executable binary.

16 Claims, 9 Drawing Sheets

(56) References Cited

OTHER PUBLICATIONS

Anand et al.; "A Compiler-level Intermediate Representation based Binary Analysis and Rewriting System"; 8$^{th}$ ACM European Conference on Computer Systems; 2013; p. 295-308.
Bruening; Efficient, Transparent, and Comprehensive Runtime Code Manipulation; Massachusetts Institute of Technology; PhD Thesis; 2004; 306 pages.
Srivastava et al.; "Vulcan—Binary transformation in a distributed environment"; Technical Report MSR-TR-2001-50; Microsoft Research; Apr. 2001; p. 1-12.
Eustace et al; "ATOM: A Flexible Interface for Building High Performance Program Analysis Tools"; Proceedings of the USENIX 1995 Technical Conf.; Jul. 1994; 27 pages.
"Function Hooking Part I: Hooking Shared Library Function Calls in Linux"; https://www.netspi.com/blog/entryid/191/function-hooking-part-i-hooking-shared-library-function-calls-in-linux; netspi; Jul. 8, 2013.
"Cuckoo Sandbox Book—Release 0.4.1"; Cuckoo Sandbox; Nov. 2012; 48 pages.
Buck et al.; "An API for Runtime Code Patching"; Int'l Journal of High Performance Computing Applications; Nov. 2000; vol. 14 No. 4; p. 317-329.
Hollingsworth et al.; "Dynamic Program Instrumentation for Scalable Performance Tools"; Proceedings of the IEEE; 1994; p. 841-850.
"How to Modify Executable Code in Memory"; https://support.microsoft.com/en-us/kb/127904; Microsoft; Jun. 24, 2015; 1 page; accessed Jun. 24, 2015.
Laurenzano et al.; "PEBIL: Efficient Static Binary Instrumentation for Linux"; IEEE Int'l Symposium on Performance Analysis of Systems and Software (IPASS); Mar. 2010; p. 175-183.
Luk et al.; "Pin: Building Customized Program Analysis Tools with Dynamic Instrumentation"; Proceedings of the 2005 ACM SIGPLAN Conf. on Programming Language Design and Implementation; 2005; p. 190-200.
Nanda et al.; "BIRD: Binary Interpretation Using Runtime Disassembly"; IEEE Computer Society; 2006; 12 pages.
Nethercote et al.; "Valgrind: A Framework for Heavyweight Dynamic Binary Instrumentation"; Proceedins of the 2007 ACM SIGPLAN Conf. on Programming Language Design and Implementation; 2007; p. 89-100.
Romer et al.; "Instrumentation and Optimization of Win32/Intel Executables Using Etch"; USENIX Windows NT Workshop; Aug. 1997; 8 pages.
Schwartz et al.; "PLTO: A Link-Time Optimizer for the Intel IA-32 Architecture"; In Proc. 2001. Workshop on Binary Rewriting; 2001; 7 pages.
Schwartz et al.; "Disassembly of Executable Code Revisited"; IEEE Computer Society, In Proceedings of the Ninth Working Conf. on Reverse Engineering; 2002; 10 pages.
Smithson et al.; "Static Binary Rewriting without Supplemental Information: Overcoming the Tradeoff betwee Coverage and Correctness"; 20$^{th}$ Working Conf. on Reverse Engineering; 2013; p. 52-61.
"Understanding Shims"; https://technet.microsoft.com/en-us/library/dd837644(d=printer,v=was.10.aspx; Microsoft; 2015; 2 pages; accessed Jun. 24, 2015.
Scheibler; "Using self modifying code under Linux"; http://asm.sourceforge.net/articles/smc.html; accessed Jun. 24, 2015; 6 pages.
Wartell et a.; "Binary Stirring: Self-randomizing Instruction Addresses of Legacy x86 Binary Code"; In Proceedings of the 2012 ACM Conf. on Computer and Communications Security, CCS; 2012; p. 157-168.

\* cited by examiner

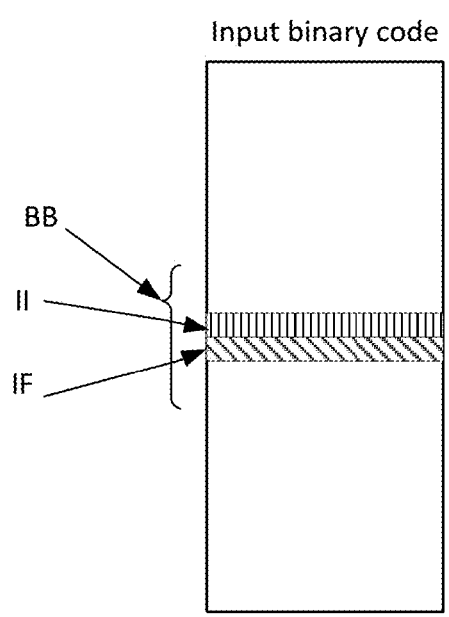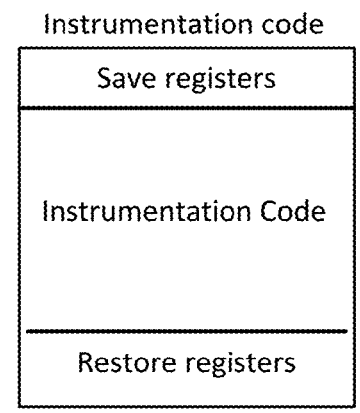
FIG. 2A    FIG. 2B

|  | Offline Binary Rewriter | Online Binary Rewriter | Online Fast Binary Rewriter |
|---|---|---|---|
| Characteristics: | | | |
| Practical for applications that run forever | No | Yes | Yes |
| Offline preprocessing | Needed | Not Needed | Not Needed |
| Immediate instrumentation | No | Yes | Yes |
| Initial overhead | None | High | Very Low |
| | | | |
| Non-Functional Requirements: | | | |
| Reliability/correctness | Yes | Yes | Yes |
| Low CPU overhead | Yes | In Steady State | Yes* |
| Low memory overhead | Yes | In Steady State | Yes* |
| Low run-time throughput degradation | Yes | In Steady State | Yes* |
| Low run-time response time degradation | Yes | In Steady State | Yes* |

Yes*: slightly higher than offline binary rewrite, similar in steady state.

```
Design 1 if(new target)
{
        write target to file
}
```

FIG. 7B

```
Design 2 if(new target)
{
        frontier = invoke BinaryRewrite
        add instrumentation @frontier
        add user instrumentation
}
```

FIG. 7C

```
Design 3 if(new target)
{
        if (pre-calculated frontier exists)
        {
                frontier = lookup database
        }
        else
        {
                frontier = invoke BinaryRewrite
        }
        add instrumentation @frontier
        add user instrumentation
}
```

BINARY REWRITING SYSTEM

CROSS REFERENCE TO RELATED APPLICATIONS

This application claims benefit under 35 U.S.C. §119(e) of Provisional U.S. Patent Application No. 61/930,133, filed Jan. 22, 2014, the contents of which is incorporated herein by reference in its entirety.

TECHNICAL FIELD

This disclosure covers the area of computer science and in particular the modification of object code or computer instructions after compilation.

BACKGROUND

Executable computer code, sometimes called machine code, native code, or binary code, is computer instructions or software in the native format or language of a computer processor or system that is intended to run or execute the executable code. Object code is generally machine code that is the output of a compiler that has taken a higher-level source code language as input. In many situations where a change to a computer program in executable code format is required, a change will be made to the human readable source code, such as C or C++, from which the program's executable code originated, and then modified source code is compiled to produce a modified version of the executable code. In many situations, however, source code is not available or may have never existed, and hence modification of a program must be done by directly changing the executable code. For example, an end-user only rarely has access to source code, and in some situations, machine code is created directly without any source code ever existing. Direct modification of machine code (or binary code) such as this is called binary rewriting. Binary rewriting is done for many reasons such as improving or simply monitoring the security, performance, or reliability of a program. A binary executable program is often referred to as a "binary".

A binary rewriter is a software tool that enables modifying binary code. It takes a binary code as input and produces an output binary code, which typically has the same functionality as input, but is enhanced in some way. These enhancements may serve a broad set of requirements such as better performance, better security features, additional instrumentation code for performance monitoring, to name a few. Binary rewriters include two main classes: static and dynamic.

Static binary rewriters take a static binary image present on the disk as input and create a new binary image that includes the required enhanced features. Since a static binary rewriter updates a binary code prior to its execution, it has a minimal impact on runtime performance and dynamic memory requirements of the binary code.

On the other hand, dynamic binary rewriters modify a binary code on the fly while it is executing. A dynamic binary rewriter acts as an execution layer between the binary code and the hardware that recompiles (translate) small sections of code at a time before running it on the hardware. This technique is popularly known as just-in-time compilation. The recompiled code in stored in a code cache to avoid the translation at each execution of a section of code.

SUMMARY

This disclosure describes a hybrid binary rewriting method, comprising configuring a binary rewriting system so that any future execution of an unmodified executable binary will trigger its binary rewriting with a desired instrumentation, where configuring includes saving configuration settings without modifying a persistent image of the unmodified executable binary. The method further comprises invoking the unmodified executable binary as the unmodified executable binary would be invoked without binary rewriting, where invoking includes copying the unmodified persistent image of the unmodified executable binary into a system memory image and thereafter executing the binary from the system memory image. The method also comprises rewriting by modifying the system memory image of the unmodified executable binary by inserting one or more new instructions in place of existing instructions, where the one or more new instructions transfer execution control to instrumentation instructions located elsewhere within the system memory image, where the instrumentation instructions at least in part were not contained in the unmodified executable binary, and where the rewriting does not modify the persistent image of the unmodified executable binary.

BRIEF DESCRIPTION OF THE DRAWINGS

A more detailed understanding may be had from the following description, given by way of example in conjunction with the accompanying drawings wherein:

FIG. 2A depicts an illustrative organization of input binary code.

FIG. 2B depicts an illustrative organization of instrumentation code.

FIG. 6 is a table summarizing some features of various embodiments.

FIG. 7A depicts illustrative instrumentation pseudo-code for an offline binary rewriter.

FIG. 7B depicts illustrative instrumentation pseudo-code for an online binary rewriter.

FIG. 7C depicts illustrative instrumentation pseudo-code for an online fast binary rewriter.

DETAILED DESCRIPTION OF ILLUSTRATIVE EMBODIMENTS

Figure 1:
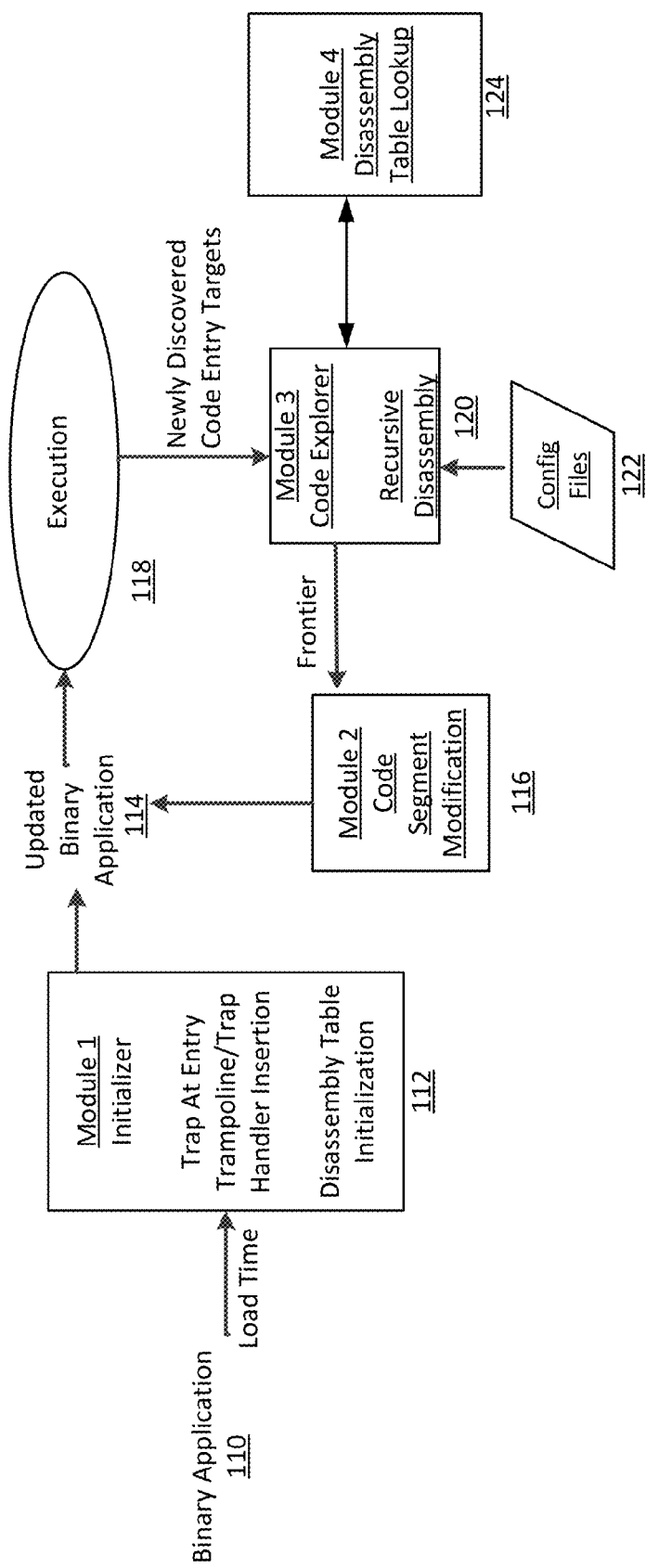
FIG. 1 depicts a software architecture diagram of an exemplary binary rewriter.

This disclosure describes a hybrid run-time binary rewriter that overcomes some drawbacks of ordinary static and dynamic rewriters. Embodiments can instrument code with very low overhead using an in-place memory rewrite of executable code by using run-time information to do an on-demand binary rewrite. The result is a low overhead system for improving the operation of a computer by, for example, enabling better security of any executable code run on the computer, or by enabling the measurement of various metrics using code inserted by the binary rewriter, such as (but not limited to) run-time during the operation of the computer, which in turn enables the subsequent use of those metrics to understand and improve the computer further.

Embodiments of the hybrid binary rewriter may be used to improve the security of any applications, applets, or device drivers installed or downloaded to the computer, and even the operating system of the computer. Security can be improved, for example, with malware detection or analysis software that uses binary rewriting to insert security checks in malware, or to modify the malware to reveal more of its behavior. Further, the binary rewriter can be used to insert code to measure performance and other metrics of the computer. The metrics measured by embodiments can be used to understand and then tune the run-time performance of the computer in its various software components. Features of various embodiments of binary rewriting include not needing to modify the persistent storage copy (for example in a hard disk file system) of the binary being rewritten, providing progressive (or recursive) code discovery and rewriting, and only needing configuration by a user once during the first of multiple invocations of the unmodified binary. Embodiments can also be applied to an intermediate representation such as a register transfer language (RTL).

Problems with Existing Static and Dynamic Rewriters

Known static rewriters experience two main practical limitations. First, they cannot guarantee that the complete binary image is modified according to the required features. This is because modern compilers interleave code and data in a binary image and it has been demonstrated that distinguishing code and data is an undecidable problem in general. Owing to this inherent undecidable problem, static rewriters either fail to identify complete code in a binary or result in an incorrect transformation due to modification of data. In an attempt to address these issues, existing static rewriters employ several distinct solutions, which collectively fail to obtain a robust solution for all practical scenarios. For example, some static rewriters require additional metadata information such as relocation information to be present in the binary in order to distinguish code from data. This results in an impractical mechanism since commercial binary code lacks any such metadata information. These rewriters also employ heuristic based pattern matching approaches to distinguish code from data and to identify function boundaries, which fails to guarantee a correct transformation in general scenarios. Other rewriters address the issue of code coverage, but do not handle all kinds of binary code, specifically they assume compiled code, and they cannot handle hand-coded assembly code, obfuscated code, packed/encrypted code, or self-modifying code.

Second, modifying the disk image of a binary might potentially violate the security policies of an enterprise. Known static rewriters change the disk image of a binary, thereby changing its associated checksum. Many existing enterprise solutions rely on the checksums of the disk image to distinguish legitimate and malicious binaries and to enforce security policies, so changing the checksums of a binary image may result in flagging the binary by the enterprise security solution.

Dynamic rewriters may address the problems experienced by static rewriters as described above. The reliance on runtime execution for code translation implicitly solves the problem of distinguishing code and data. A piece of code in a binary is updated or translated only if it is reachable through an execution. Since a piece of data is not reachable on an execution path, dynamic rewriters ensure that they would never incorrectly modify a data section. Further, since they do not change the disk-image, they do not change the checksum associated with the binary.

Known dynamic rewriters, however, experience severe practical limitations associated with runtime and memory overhead. Since the code is translated at the time of execution, the code translation time also gets added to the execution time of binary code. This results in huge runtime overhead, ranging from 40% to almost 1,000%. Second, the employment of a code-cache adds significantly to dynamic memory requirements of binary code.

Third, since dynamic rewriters rewrite code to a separate location (the code cache), this changes the addresses of code locations. Hence to keep all the branches to those locations correct, all run-time computed targets of control-transfer instructions (also called targets of indirect control transfers) must be translated at run-time to refer to new addresses in the code cache instead of the original addresses in the binary's image. This translation of addresses further adds to the run-time overhead of the binary rewriter Hybrid Run-Time Binary Rewriter A hybrid run-time assisted binary rewriting system is described herein that overcomes many of the drawbacks of existing static and dynamic rewriters. There are several benefits over existing static rewriters, including:

(i) Embodiments do not need any metadata information such as relocation entries to solve the problem of distinguishing code and data.

(ii) Embodiments do not rely on any code pattern heuristics from compiled code to recognize code; hence embodiments work for obfuscated, packed/encrypted, self-modifying and hand-modified assembly code.

(iii) Embodiments may rely on run-time information to accurately distinguish code from data.

(iv) Embodiments may never change the disk image or the checksum associated with it, hence they do not break commercial security and enterprise tools.

Some benefits over existing dynamic rewriters include:

(i) Embodiments do not require any code-cache, hence they have low memory and runtime overhead.

(ii) Embodiments may require in-place memory rewrite so that the next time the same code is executed, it already has the enhancements.

(iii) Embodiments may be invoked from within the binary every time new code is discovered; hence instead of the binary running with the rewriter's process, the rewriter becomes part of the binary's process that runs on demand and performs the in-place memory rewrite.

A hybrid static-dynamic binary rewriter may employ a static mechanism to distinguish code from data, while relying on run-time information in case the static mechanism fails to distinguish the code from data. This mechanism begins as a dynamic framework and progressively evolves towards a traditional static framework. Initially, only the program locations which are guaranteed as code are rewritten. The unknown portions of program are instrumented to again invoke the binary rewriter framework. The execution of such unknown locations of the program progressively results in the discovery of more code locations and eventually results in the rewriting of all the code that has direct control transfer from these unknown locations.

A feature of some embodiments is that they use an in-place memory rewrite in a dynamic rewriter. An in-place memory rewrite in this context means that the rewriter leaves the memory image of the binary in its original location, and within that image, minimally changes only those instructions necessary for rewriting, while leaving other instructions unmodified. The code is never copied to a code cache.

A system with an in-place memory rewriter has lower overhead compared to a system with a code cache, since the overhead from at least the following actions are absent: (i)

no need to copy instructions to a code cache; (ii) no need to check if code fragments are in the code cache during the execution of the program; and (iii) with a code cache, the targets of control-transfer instructions need to be translated at run-time since the instructions in the code cache have different addresses than in the original memory image. In embodiments, all control transfer targets are preserved in their original locations, such that no translation is needed.

Although a hybrid static-dynamic binary rewriter has some similarities with minimally invasive static rewriters, like ETCH (published by The University of Washington), a key difference is that whereas ETCH is a static rewriter which modifies the file system image of the program, a hybrid binary rewriter operates using run-time information and modifies the main memory image of the program, leaving the file system image unchanged. This has the key advantage of resulting in a more robust rewriter that is not reliant on static analysis and on assuming compiled code, and also a hybrid rewriter works when integrity checks are done on the file system image using mechanisms like checksums, whereas rewriters like ETCH do not. An advantage of modifying the main memory image is the elimination of all of the overheads of dynamic rewriters that use code caches. In this way our rewriter improves upon both ETCH and existing dynamic rewriters, and has unique capabilities not present in either.

FIG. 1 depicts a software architecture diagram of an exemplary binary rewriter. This is one possible embodiment, many others may be possible. It consists of the following four software modules: (i) Module 1 112—an initializer module that dynamically loads the rewriter code as a library inside the binary memory image and initiates the execution of the rewriter code; (ii) Module 2 116—a code modification module that updates the executing application in-place memory; (iii) Module 3 120—a code exploration module that begins code disassembly from a certain known code program point; and (iv) Module 4 124—a lookup module which keeps track of the bytes already known as code.

The main functionality of each of these modules is described below along with how they interact with each other and other further details. When a binary application 110 starts executing, the Module 1 112 intercepts the operating system loader and dynamically loads the rewriter code as a library inside the binary image. Any method to intercept a program during its execution can be used. This may be achieved by one of: intercepting the loader, using a shim, interrupting the application, or some other mechanism. Three possibilities are described below; however, many others may be possible. Further, if required by the method used, it inserts an exception at the entry point of the application and also registers a corresponding exception handler. The handler calls the code exploration module (Module 3 120) with the entry point of the application as the known code program point. Any method that achieves this functionality can be used. Once the application reaches its entry point, it encounters the exception, the corresponding handler subsequently calls the code exploration module (Module 3 120). The code exploration module use configuration information stored in config files 122. The optional config (configuration) files may contain in part information about the format of the instructions in the instruction set of the target processor, which enables Module 3 120 to properly recognize code in the binary being rewritten. The config files can be helpful if the binary rewriter is meant for more than one instruction set. If only one (or a small number of) instruction sets are supported, then the config file may be eliminated by instead hard-coding the information about the format of the instructions of the instruction set(s) in question into the binary rewriter.

If such config files 122 are needed, then they may contain information about the binary format for every instruction in the instruction set of the binary code to be rewritten. For example, they could store their information as a mapping between all possible instruction opcodes in that instruction set and the format of the instruction corresponding to that opcode. The mapping may be maintained in a table or another data structure that can map such quantities. The format of the instruction may be described in terms of the length of the instruction in bits, and the bit position ranges for each field of the instruction encoding for that opcode's instruction. Such fields for instructions typically include register operands, memory operands, immediate operands, and sometimes other fields like function select for ALU instructions. In this way, the config files allow the binary rewriter to understand the format of all the instructions in the binary to be rewritten.

To be clear, the config files 122 are not the same as the configuration described in User Configuration 810 and Save configuration 812. The configuration in 810 and 812, which will be described later in this document, refers to configuration of the binary rewriting system to specify which binaries should be rewritten, with what instrumentation, and at what locations. Further configurations referred to in the claims in this document also refer to the configurations in 810 and 812; and not the configurations in 122.

The code exploration module (module 3) explores the program code through the popular recursive traversal mechanism. Starting from a known program point (which is initially the entry point of the program), it explores all program paths which are reachable through direct control transfers (branch, jump and call instructions with fixed target addresses). As is later noted, the known program point later in the execution will be in general different. It stops exploration at indirect control transfers (branch, jump and call instructions with runtime computed target addresses) and computes a program frontier for the current known program point containing all indirect control transfers reachable from the known program point. A program frontier, as used herein, refers to a set of indirect control transfers (branches, jumps, or calls). Once the mechanism disassembles an instruction, it updates the disassembly table (Module 4 124) to reflect that the corresponding bytes are known code and have already been disassembled. Before disassembling a new instruction, it also checks the disassembly table if the corresponding bytes have already been disassembled. If it has been disassembled, then it discontinues the exploration along that path. Whenever it encounters an indirect control transfer instruction it stops disassembling along that path and adds it to the frontier for the current known program point. Once all indirect calls compromising the frontier from the known program point are discovered, it passes this information to the code modification module (Module 2 116).

The code modification module (Module 2 116) updates the code locations represented by the elements in the program frontier to continue code exploration at these program points. Before each indirect control transfer of the frontier, Module 2 116 inserts a jump to a trampoline. A trampoline is an extra piece of code which is inserted in a binary image. The trampoline code inspects the actual program target address at this indirect call instruction. If the target address has already been disassembled (Module 4 124), it returns the control back to the program point following the indirect call transfer. Otherwise, it transfers the control to the code exploration module (Module 3 120) to continue code exploration starting from the target address as the new known program point. Since the code exploration module 120 is continuously called at each indirect transfer instruction, it results in complete code discovery as the execution progresses. When the code modification is complete, the modified binary 114 is given control to execute at the program point where Module 1 112 was called. The code modification in a hybrid binary rewriter system can be used for modifying any code in the binary, such as by removing existing code and by replacing it with null operations (NOPs), changing code, or by adding new code into the binary at any point in the program of the user's choosing. Such added code is referred to herein as instrumentation and the process of adding such code is referred to as instrumenting such code or "to instrument" such code.

In the initial stages when the application starts executing, the code exploration module 120 is called often since the binary rewriter is still discovering new code. However, in the steady state, code exploration 120 is not called as often since most parts of the code are already discovered. At this stage the application rarely if ever calls the binary rewriter. The only overhead in the steady state is the overhead of any user inserted code such as instrumentation code.

A detailed description is now provided of the binary rewriting system that can be used to instrument binary code correctly and completely without the presence of any metadata information such as relocation, debug or symbolic information. The system does not change the disk image (or other persistent storage image) of the binary, but rather changes the original in-place memory image of the binary when it is executing. The techniques presented are not specific to any particular Instruction Set Architecture (ISA) or operating system platform. These techniques can be employed to any instruction set and to any binary code, even those that have obfuscated code, packed/encrypted code or hand-modified assembly within them.

A hybrid static-dynamic binary rewriter can use dynamic information to discover all the code present in a binary. It begins as a dynamic framework and progressively evolves towards a traditional static framework. Initially, only those code locations which are guaranteed as code are rewritten. The exit points from these known portions of code are instrumented with call backs to the binary rewriter framework. The execution of such unknown locations of code progressively results in exploration of more code locations and eventually results in rewriting of the complete code.

The four main modules of our framework (as shown in FIG. 1) are: (i) Module 1 112—an initializer module that dynamically loads the rewriter code as a library inside the binary memory image and initiates the execution of rewriter code; (ii) Module 2 116—a code modification module that updates the executing application in-place memory; (iii) Module 3 120—a code exploration module that begins code disassembly from a certain known code program point; and (iv) Module 4 124—a lookup module which keeps track of the bytes already known as code. These four modules are described in detail in the sub-sections below.

Module 1—Initializer 112

The initializer module 112 is responsible for activating the binary rewriter framework at the time of initial execution of a binary. A hook is inserted at the entry point of input binary code to call the binary rewriter framework. Three methods are described below that can be used to hook the entry point, although other methods can be used. The method may be chosen based upon whether changing the disk image is acceptable or not.

If it is acceptable to change the disk image, then the entry point of binary code may be modified to call the framework directly. The entry point of a binary code may be determined by parsing the headers. The binary rewriting framework may be loaded as a dynamic library, and the instruction at the entry point may be replaced by a jump to a trampoline, which in turn contains a jump to the newly loaded library code.

If the disk image cannot be changed, for example due to hash code-based enterprise security products, at least three different mechanisms may be employed to implement the initializer module 112. Several others mechanisms are possible as well.

A first method involves intercepting the operating system loader. The execution step, at which the loader passes the execution thread to the input binary code, may be intercepted and a software interrupt may be added at the entry point of the code. Further, a handler may be inserted corresponding to this interrupt, which calls the binary rewriting framework. When the execution control is passed to the binary code, the interrupt at entry point may be triggered and the corresponding handler may call the rewriter framework.

The second method involves intercepting a specific system call present in the startup code which calls the main procedure in a program. Both WINDOWS and LINUX operating system use specific system calls (WinMain and libc_start_main respectively) to call the main function in a program, irrespective of the compiler used to obtain a program. One option is to employ the Shim infrastructure on Windows, or the API hooking mechanism on Linux to intercept the execution of corresponding system calls. The intercepted system call first initializes the binary rewriting framework, which later passes the control to the entry point of the input program.

The third method involves interrupting the binary during its execution. This method relies upon detecting that the binary which needs to be instrumented happens to be running at that point in time. If the binary is found to be running, the binary is interrupted, and the rewriter is invoked starting from the code address in the binary at which the binary's execution will resume. This will create an initial frontier before the binary's execution resumes. Thereafter, when the binary resumes execution, the code exploration and modification routines will discover and rewrite more and more code as the binary is executed. A downside of this third method compared to the first two methods is that the rewriting starts at the middle of the binary's execution, so portions of the binary's code that are executed before the binary is interrupted, but are never executed thereafter will not be instrumented. However, all code executed after the binary is interrupted will be instrumented.

The disassembly table 124 may be initialized to reflect that none of the instructions have been disassembled so far. The disassembly table may include one bit for each byte offset of the executable, where each bit represents if the corresponding byte offset has been disassembled or not. This module may initialize each of these bits to zero indicating that none of the bytes in the binary have been disassembled as yet. The disassembly table may be implemented by a data structure other than a table provided it has the same lookup index and the same stored data per lookup index.

Module 2—Code Segment Modification 116

Embodiments of a hybrid rewriter modify the memory image of the executing binary by inserting trampolines in a new portion of the code and calls to these trampolines within the original code of the binary. Unlike traditional static binary rewriters, the disclosed framework does not change the disk image thereby respecting checksum-based security policies.

To develop a generic technique for rewriting binary code, the self-modifying code support of the underlying operating system may be used. Briefly described below are the techniques to be employed on the MICROSOFT WINDOWS system. A similar method may be be employed on Linux-based platforms. Other operating systems have similar support for self-modifying code.

A Microsoft website presents techniques to support self-modifying code. The WINDOWS operating system contains a mechanism to support self-modifying code in programs which uses the VirtualProtect application programming interface (API) present in the WINDOWS library. The steps used to change the memory image are:

Step 1—Call VirtualProtect( ) on the code pages you want to modify, with the PAGEWRITECOPY protection.

Step 2—Modify the code pages as desired

Step 3—Call VirtualProtect( ) on the modified code pages, with the PAGEEXECUTE protection.

Step 4—Call FlushInstructionCache( ).

Using the above steps, calls may be inserted to the trampolines into the input binary as and when necessary. Any other method for supporting self-modifying code may also be used. an embodiment of a method for inserting trampolines into binary code is described below.

A trampoline is a code sequence (typically small) that is inserted into another binary. A trampoline is typically inserted at the end of original code segment to avoid modification of original code. These trampolines are usually invoked through newly inserted jumps from within the original code segment at the point the new trampoline code is desired to be inserted. At their end, trampolines transfer the control back to the original code.

Trampolines are inserted into the input binary code primarily for two reasons: (i) to invoke the binary rewriter at indirect calls with the new target information so that the binary rewriter can start disassembling from the new target; and (ii) to insert user instrumentation code at any point of the user's choosing. This instrumentation code may perform performance monitoring, security checks or network logging to name a few applications; many others are possible. Any form of user instrumentation is possible within embodiments of a hybrid binary rewriter.

Jumps to trampolines are inserted so that the original code is not rendered incorrect and they have the lowest possible overhead. In one embodiment on how to reduce overhead, below are listed methods in increasing order of overhead for inserting such jumps without breaking the correctness of the input binary code. Hence, every time a trampoline is to be called, the rules are checked starting from Rule 1 to find the first rule whose conditions are satisfied. In this way, instrumentation may be inserted using the least expensive method.

FIG. 2A depicts an illustrative organization of input binary code. FIG. 2B depicts an illustrative organization of instrumentation code. The terms used in FIG. 2A, FIG. 2B, and in the rules below are defined here:

II (Instrumented Instruction): The instruction in the input binary code before whose execution the jump to a trampoline must be inserted.

IF (Instruction that follows): The instruction in the input binary that immediately follows II.

BB (Basic Block): The basic block (i.e., a series of sequential instructions) within which II belongs.

Instrumentation Code (IC): The small code segment that needs to be executed before the execution of II in the input binary. This code is placed in a trampoline as a new code sequence. First, the registers modified by the instrumented code are stored to memory, followed by the instrumented code and then all the stored registers are restored from memory.

The following rules are checked in order and the first one whose conditions are met is used to insert the trampoline.

Rule 1: If the size of II is long enough to be replaced with a long jump, then replace it (for example, in the x86 architecture this translates to an instruction that is at least 5 bytes long since a long jump is also 5 bytes long). At the target of the long jump is a trampoline at which we insert the IC followed by the instruction II itself, and then return to IF. If II happens to be a control transfer instruction, then the return to IF will not be executed, thereby keeping the functionality of the original binary intact.

Rule 2: Find an instruction X in the same BB before II that is long enough and replace it with a long jump. Copy all the instructions in between this replaced instruction and II to within the trampoline. This insures that the correct values of the registers/memory are used as they would be before II at the trampoline. After these instructions, place the IC in the trampoline, followed by II, and then the return instruction to IF.

Further, add a bad opcode at the first byte of II. This is done in case there is a jump from code that has not been discovered so far to II or any instruction in between instructions X and II. In this case, the code at the jump's target would have been copied to the trampoline. When this bad opcode was hit, it may cause the corresponding error-handling interrupt handler to run, which may then transfer control to the trampoline at the point where it contains the IC. The probability of running this exception is very low since this represents a case when there is a jump to the middle of this function from another function, the probability of which in compiled code is very low. However if this did happen, perhaps because the code is not compiled code, then the described method would handle it correctly.

Rule 3: Try replacing two instructions (or maybe more). These would be the II and the one (or two) before it. When this is done, a jump target is constructed such that the instruction that appears at any byte offset in the middle of the replaced sequence of instructions has an invalid/bad opcode. In this manner, if these instructions were jumped to from a different path then the trampoline code may be executed via the interrupt handler. The only case where the exception would be hit is if there was a jump to the middle of this sequence, the probability of which is very low.

Rule 4: If all else fails, then just put a bad opcode at II. This will incur the overhead of an exception every time in this case. However, it would work correctly.

In the rules above, instead of adding a bad opcode, some other method of causing an error-handling interrupt, such as by changing the binary code can be used.

Module 3—Code Exploration 120

Each time any previously unexplored code is executed in a binary, the code exploration module is called and informed about this new code location. This module starts code exploration at this new program location. The code exploration module explores the program code through the popular recursive traversal mechanism. Starting from a known program point, it explores all program paths which are reachable through direct control transfers (jump and call instructions with fixed target addresses) and computes a program frontier containing all program points with indirect control transfers (jump and call instructions with runtime computed target addresses) reachable from the initial known program point. Whenever it encounters an indirect control transfer instruction it stops disassembling along that path and adds it to the frontier for the current known program point. The detailed description of this module is below.

Recursive traversal disassembly and identification of frontiers:

Step 1: Add the known entry point to a queue of entry points to disassemble from. Pop from this queue and proceed to step 2.

Step 2: Check if this known entry point's address has already been disassembled. If disassembled go to step 3, else go to step 4

Step 3: If it has been disassembled, pop from the queue of entry points and go to step 2 again. If the queue is empty, return from the recursive traversal module.

Step 4: If this instruction has not been disassembled, disassemble it, using the ISA config files which store the format of binary instructions for the current instruction set. Change the bits associated with this instruction in the disassembly table to reflect that these bytes have now been disassembled. If this is a control transfer instruction, then go to step 5, else move onto the next sequential instruction and go to step 2.

Step 5: If this is a direct control transfer instruction, mark the target as a known entry point and go to step 1. If this is an indirect control transfer instruction, then add it to the frontier of indirect control transfers. Pop from the queue of known entry points and proceed to step 2.

In this manner all direct control transfer paths are disassembled from a known code entry point to a frontier of discovered indirect calls beyond which it is difficult to disassemble reliably without dynamic information.

Module 4—Disassembly Table Lookup 124

This module provides the interface to lookup the disassembly table. It is a simple table lookup. The disassembly table stores for each instruction in the input binary if it has been disassembled before or not. When it is queried on an instruction, it returns this information. Any data structure or code module that provides the same functionality can be used instead of a table.

Three designs for the binary rewriter are presented below; however, many others are possible. FIG. 6 is a table summarizing some features of these designs.

Figure 3:
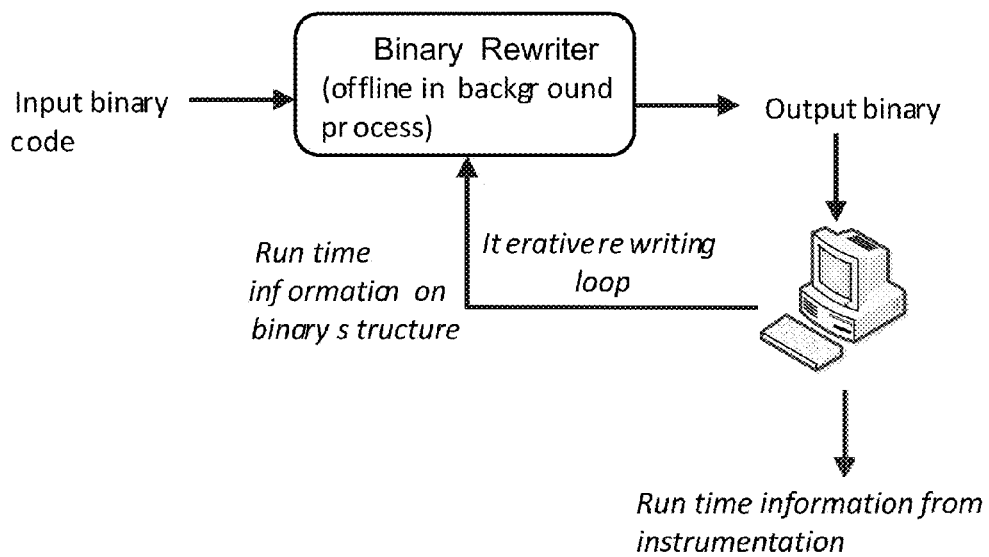
FIG. 3 depicts an example embodiment for an offline binary rewriter.

The Offline binary rewriter is a first embodiment. In this embodiment, both analysis and rewriting are performed offline (when the input application is not executing). FIG. 3 depicts an example for an offline binary rewriter. New code entry points that are discovered from the instrumentation of indirect control flow frontiers are written to a file during the execution of the binary code. In the background when the executable is not running, disassembly occurs from the newly discovered targets and further new frontiers are discovered. Additional instrumentation is then added to discover new targets at the newly discovered frontiers offline before running the executable a second time. The instrumentation pseudo-code used in this design is shown in FIG. 7A. User defined instrumentation is also added to all of the discovered code.

Figure 4:
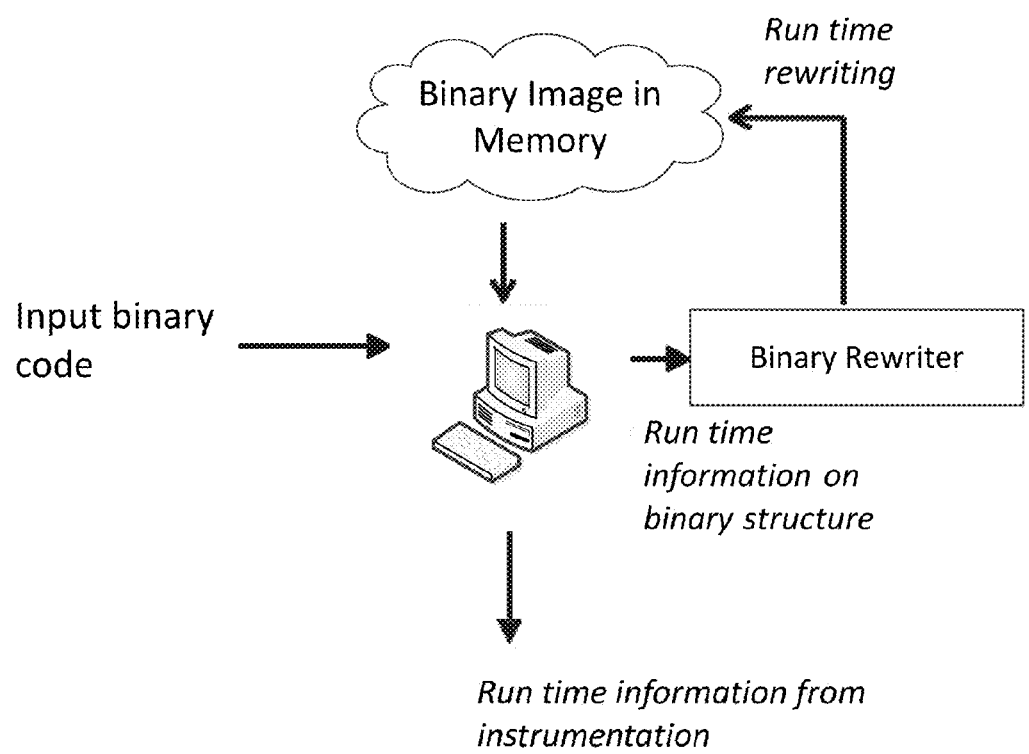
FIG. 4 depicts an example embodiment for an online binary rewriter.

Embodiment 2 is an online binary rewriter. In this embodiment both analysis and rewriting are performed online i.e., when the application is executing. FIG. 4 depicts an example design for an online binary rewriter. One possible software architecture for this design is in FIG. 1. Many others may be possible. While the application is executing, whenever an indirect control flow is executed and a new code entry point is discovered, the binary rewriter is invoked from the application informing it about the new code entry point. The binary rewriter then disassembles from this newly discovered code entry point and discovers a new frontier of indirect control flow. It then inserts instrumentation to invoke the binary rewriter as required at these indirect control flow instructions. The instrumentation pseudo-code used in this design is shown in FIG. 7B. Further, it also inserts user instrumentation where ever required in this newly discovered code. In this embodiment, the application is stalled whenever binary rewriting is running. In a steady state, the binary rewriter would not be called often, but when the setting up is going on, the application may run somewhat slower.

Figure 5:
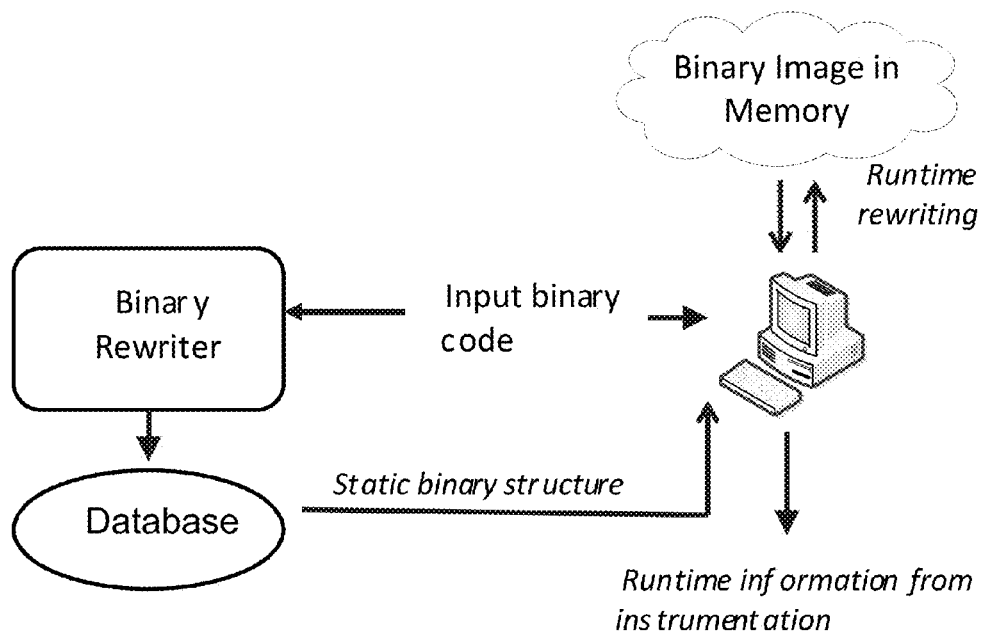
FIG. 5 depicts an example embodiment for an online fast binary rewriter.

Embodiment 3 is an online fast binary rewriter. The third variation of the binary rewriter is one in which analysis is performed offline and rewriting is performed online. FIG. 5 depicts an example for an online fast binary rewriter. This embodiment will result in the binary incurring less run-time overhead in its early stages of execution compared to design 2 which needs to perform the analysis of the binary during run time. In contrast, embodiment 3 performs binary analysis offline and stores the result for use during run time for rewriting. In this embodiment, binary characterization is used to detect most or all of the possible entry points in the binary. Binary characterization searches for constants in the code segment of the binary code which also represent valid code addresses. The addresses represented by these constants are possible (although not guaranteed) entry points in the binary. In a first offline run, the frontiers of indirect control transfers may be calculated from each of the entry points and stores in a database. It is harmless if some of the possible entry points in this set are actually not legal entry points, since their disassembly results will not be used, but that does not break correctness of the running binary code. Next when the application is running, whenever it encounters an indirect control transfer and discovers a new code entry point, first a check is performed to see if there is a pre-calculated frontier for this code entry point in the database. If there is one, then trampolines are inserted at each point in this frontier. Only if a pre-calculated frontier does not exist is the binary rewriter invoked from within the application. The required user instrumentation is also inserted in the newly discovered code region. The probability of invoking the code exploration module that computes the frontiers at run-time is low since most or all of the entry points are discovered by binary characterization. The pseudo code of the trampoline used in this design is shown in FIG. 7C. As described, the application may be enabled to run without run-time overhead from the beginning.

The entire binary rewriting system described so far may be applied to both systems without and with a code cache. A code cache is a portion of memory separate from the memory image of the code segment of the binary executable program into which the binary rewriting software stores copies of instructions present in the code segment to execute. In a system without a code cache, the instrumentation is inserted into the original system memory image of the binary code. In contrast in a system with a code cache, the instrumentation is inserted into the copy of the code in the code cache.

Figure 8:
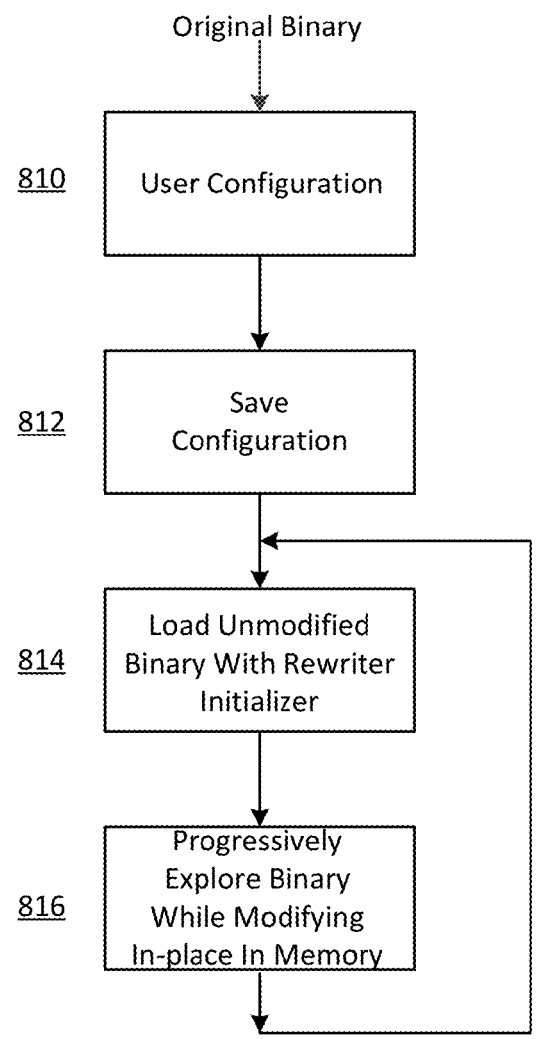
FIG. 8 is a flowchart depicting an embodiment of a one-time configuration process for a dynamic rewriter.

FIG. 8 depicts the one-time configuration process for an example hybrid binary rewriter. At step 810, an original, unmodified binary is configured by a user for the desired instrumentation. At step 812 that configuration is saved. In step 814, the unmodified binary is loaded with the rewriter initializer, such as initializer 112 of FIG. 1. In step 816, the binary is progressively explored and instrumented during execution using, for example, code explorer 120 and code modifier 116 of FIG. 1. Following step 816, the binary can be executed again at step 814 without repeating the user configuration step.

In the user configuration of step 810, the user may indicate which binary executable programs should be rewritten. This allows the user to rewrite only a subset of programs. In this case, the user configuration information contains, in part, the names or full paths in the file system of the binary files to be rewritten, or a subset of paths in which binaries should be rewritten, or some other attribute distinguishing which files are to be rewritten. Other possible ways of specifying which binaries to rewrite are also possible.

The other part of the user configuration information of step 810 may consist of the locations or location specifications at which instrumentation should be inserted, as well as the contents of the instrumentation at each location or location specification. Locations may be specified by their addresses, or more typically by location specifications. For example, the user may specify that instrumentation should be inserted before certain program features such as internal function calls, library function call, loops, and switch statements. Many other possible program features are possible.

Figure 9:
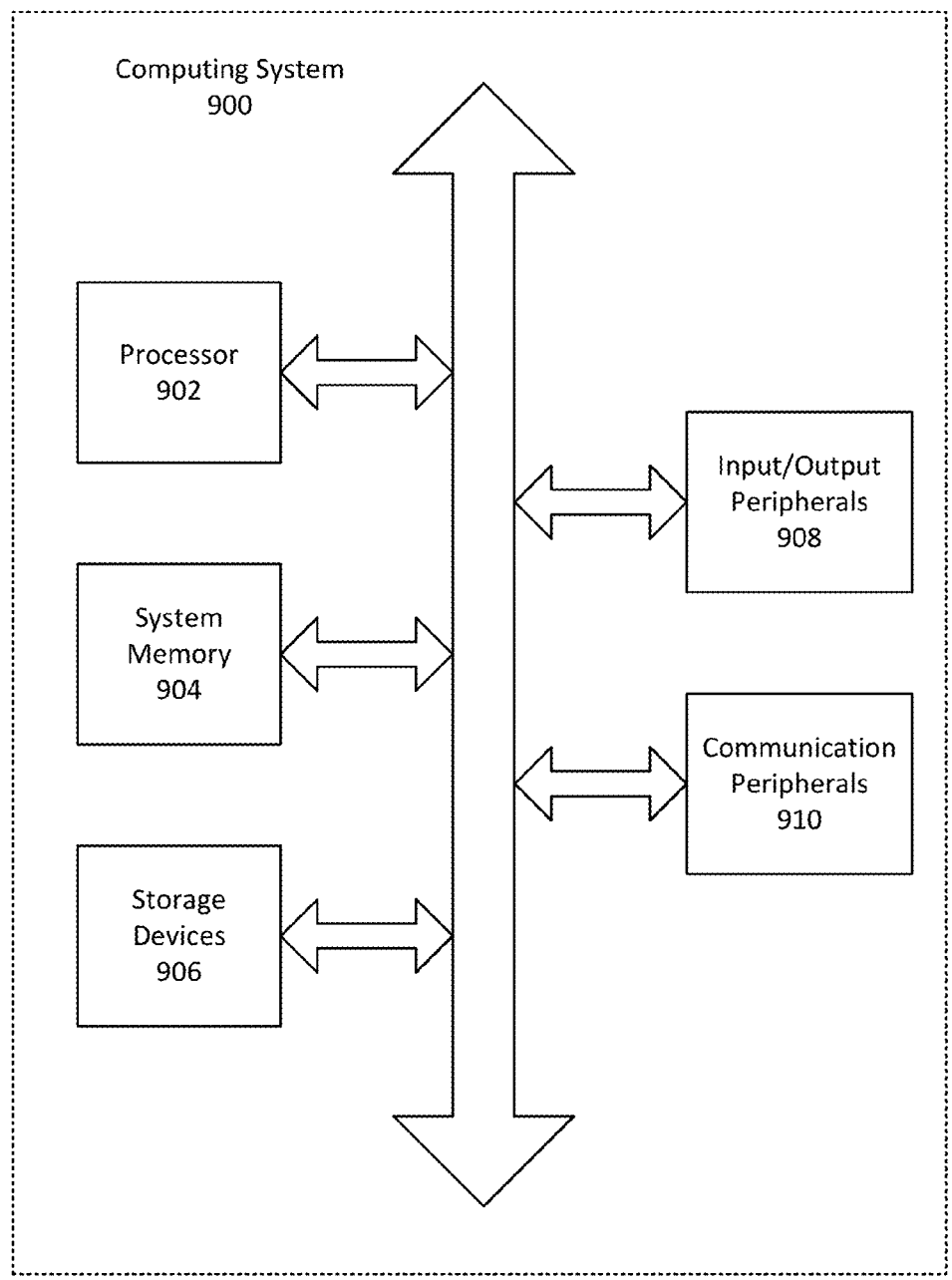
FIG. 9 depicts a general computing system.

Step 812 saves the configuration information described in step 810 in some storage on the computer, such as system memory 904 of storage devices 906 as illustrated in FIG. 9 below. For example, the information could be stored in configuration files on the file system of the computer; other storage is possible.

Step 814 is meant to be invoked automatically without user intervention whenever a binary is invoked. Step 814 may use the initializer module 112 to intercept the binary's execution. During the initializer module, the configuration information is read. Steps taken thereafter may include checking whether the binary currently being run is one of the specified files to be rewritten in the configuration information. If so, then the binary rewriter initializer is invoked. Further, the initializer could read the configuration information portion specifying the location or location types where the instrumentation should be done, and the instrumentation at each. Thereafter the rewriter uses this configuration information to guide where and how it inserts instrumentation. FIG. 9 depicts a general computing system 900. As described above, the operations associated with a hybrid binary rewriter may be implemented on a wide variety of computing environments similar to computing system 900, such as commodity-hardware computers, virtual machines, computing clusters and computing appliances, and cloud computing. Any of these computing devices or environments may be referred to as computing nodes or systems.

In a basic configuration, the computing device may include at least a processor 902, a system memory 904, storage devices 906, input/output peripherals 908, communication peripherals 910, and an interface bus connecting these various components. The interface bus may be configured to communicate, transmit, and transfer data, controls, and commands between the various components of the computing device. The system memory and the storage device comprise computer readable storage media, such as RAM, ROM, EEPROM, hard-drives, CD-ROMs, optical storage devices, magnetic storage devices, flash memory, and other tangible storage media. Any of such computer readable storage medium can be configured to store instructions or program codes embodying aspects of the disclosure. Additionally, the system memory comprises an operation system and applications. The processor is configured to execute the stored instructions and can comprise, for example, a logical processing unit, a microprocessor, a digital signal processor, and the like.

The input/output peripherals 908 include user interfaces, such as a keyboard, screen, microphone, speaker, touchscreen interface, other input/output devices, and computing components—such as digital-to-analog and analog-to-digital converters, graphical processing units, serial ports, parallel ports, universal serial bus, transmitter, receiver, etc. The input/output peripherals 908 may be connected to the processor through any of the ports coupled to the interface bus.

Finally, the communication peripherals 910 of the computing device are configured to facilitate communication between the computing device and other computing devices (e.g., between the computing device and the server) over a communications network. The communication peripherals include, for example, a network interface controller, modem, various modulators/demodulators and encoders/decoders, wireless and wired interface cards, antenna, etc.

The communication network includes a network of any type that is suitable for providing communications between the computing device and the server, and may comprise a combination of discrete networks, which may use different technologies. For example, the communications network includes a cellular network, a Wi-Fi/broadband network, a local area network (LAN), a wide area network (WAN), a telephony network, a fiber-optic network, or combinations thereof. In an example embodiment, the communication network includes the Internet and any networks adapted to communicate with the Internet. The communications network may be also be configured as a means for transmitting data between the computing device and the server.

By way of example, storage devices 906 may be used as persistent storage, where the unmodified binary file may be kept, along with any configuration data and exploration map stored for later use between invocations of the unmodified binary file. When an unmodified binary is invoked it may be copied into system memory 904 along with binary rewriter modules 1-5 of FIG. 1

The techniques described above may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps, including creation of or changes to a billing services account, may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state.

The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be exercised from the combination, and the claimed combination may be directed to a subcombination or a variation of a subcombination.

What is claimed:

1. A hybrid binary rewriting method, comprising:
configuring a binary rewriting system so that any future execution of an unmodified executable binary will trigger its binary rewriting with a desired instrumentation code, by saving configuration settings without modifying a persistent image of the unmodified executable binary, the configuration settings include specifying a code location in the unmodified executable binary where the desired instrumentation code will be inserted;
invoking the unmodified executable binary as the unmodified executable binary would be invoked without binary rewriting, wherein invoking the unmodified executable binary includes copying the unmodified persistent image of the unmodified executable binary into an original system memory image and executing the unmodified executable binary from the original system memory image; and
rewriting the unmodified executable binary by inserting one or more new instructions in place of replaced existing instructions at runtime within the original system memory image, the one or more new instructions when executed transfer execution control to instrumentation instructions located elsewhere in memory, the instrumentation instructions at least in part not being contained in the unmodified executable binary, all instructions in the original system memory image before rewriting, except for replaced existing instructions, being executed from the original system memory image, and the rewriting does not modify the persistent image of the unmodified executable binary.

2. The method of claim 1, wherein the configuring step is optionally repeated to update the configuration settings.

3. The method of claim 1, wherein the invoking step includes at least one of: intercepting an operating system loader, intercepting any system call present in the unmodified executable binary during execution, and interrupting the unmodified executable binary during execution.

4. The method of claim 1, further comprising:
inserting instrumentation instructions within the original system memory image, wherein the instrumentation instructions contain calls to software in the binary rewriting system, either directly or through other software, to perform further rewriting of the original system memory image.

5. The method of claim 1, wherein the one or more new instructions include a jump instruction or an instruction that causes an operating system trap.

6. The method of claim 1, further comprising:
using instruction disassembly to replace a single byte of the replaced existing instructions with a bad opcode that causes an interrupt at runtime.

7. The method of claim 1, further comprising:
using instruction disassembly to identify an existing instruction in the unmodified executable binary to be replaced by a new instruction in the one or more new instructions based on the existing instruction being long enough to fit a long jump.

8. The method of claim 7, wherein instruction disassembly comprises the recursive traversal method.

9. A non-transitory computer readable medium comprising instructions for rewriting binary instructions for a computer, the medium comprising instructions that, when executed on the computer, cause the computer to at least:
configure a binary rewriting system so that any future execution of an unmodified executable binary will trigger its binary rewriting with a desired instrumentation code, wherein the instructions cause the computer to save configuration settings without modifying a persistent image of the unmodified executable binary and the configuration settings include specifying a code location in the unmodified executable binary where the desired instrumentation code will be inserted;
invoke the unmodified executable binary as the unmodified executable binary would be invoked without binary rewriting, wherein the instructions that cause the computer to invoke the unmodified executable binary copy the unmodified persistent image of the unmodified executable binary into an original system memory image and execute the unmodified executable binary from the original system memory image; and
rewrite the unmodified executable binary by inserting one or more new instructions in place of replaced existing instructions at runtime within the original system memory image, the one or more new instructions when executed transferring execution control to instrumentation instructions located elsewhere in memory, the instrumentation instructions at least in part not being contained in the unmodified executable binary, all instructions in the original system memory image before rewriting, except for replaced existing instructions, being executed from the original system memory image, and the persistent image of the unmodified executable binary not being modified.

10. The non-transitory computer readable medium of claim 9, wherein the instructions further cause the computer to update the configuration settings.

11. The non-transitory computer readable medium of claim 9, wherein the instructions cause the computer to invoke the unmodified executable binary by at least one of: intercepting an operating system loader, intercepting any system call present in the unmodified executable binary during execution, and interrupting the unmodified executable binary during execution.

12. The non-transitory computer readable medium of claim 9, the instructions further cause the computer to:
insert instrumentation instructions within the original system memory image, wherein the instrumentation instructions contain calls to software in the binary rewriting system, either directly or through other software, to perform further rewriting of the original system memory image.

13. The non-transitory computer readable medium of claim 9, wherein the one or more new instructions include a jump instruction or an instruction that causes an operating system trap.

14. The non-transitory computer readable medium of claim 9, wherein the one or more new instructions use instruction disassembly to replace a single byte of the replaced existing instructions with a bad opcode that causes an interrupt at runtime.

15. The non-transitory computer readable medium of claim 9, wherein the one or more new instructions use instruction disassembly to identify an existing instruction in the unmodified executable binary to be replaced by a new instruction in the one or more new instructions based on the existing instruction being long enough to fit a long jump.

16. The non-transitory computer readable medium of claim 15, wherein instruction disassembly comprises a recursive traversal method.

\* \* \* \* \*